3,243,480
POLYESTER RESINOUS COMPOSITIONS CONTAINING HALOGEN

Richard M. Anderson, St. Louis, and James C. Wygant, Creve Coeur, Mo., assignors to Monsanto Company, a corporation of Delaware
No Drawing. Filed Jan. 2, 1963, Ser. No. 248,851
11 Claims. (Cl. 260—869)

The dihalo succinic anhydride and its derivatives are disclosed and claimed in application S.N. 248,853, filed of even date herewith. Application S.N. 248,853 is now abandoned but the subject matter thereof was carried into applications Serial No. 405,819, filed October 22, 1964, and Serial No. 437,258, filed March 4, 1965, in which latter application the subject matter is now described and claimed.

This invention relates to new resinous compositions containing halogen and to methods for their preparation. More particularly the present invention relates to flame-retardant polyester resins containing (2,3-dihaloalkyl) succinic compounds as reacted monomer.

An object of this invention is to provide new resinous compositions. Another object is to provide halogen-containing polyester resins. Another object is to provide flame-retardant polyester resins. A further object is to provide methods for chemically combining polybasic (2,3-dihaloalkyl)succinic compounds in polyesters. A special object is to provide methods for chemically combining (2,3-dihalopropyl)succinic anhydride in polyesters.

These objects and others which will be evident are accomplished by esterifying polybasic (2,3-dihaloalkyl) succinic compounds with saturated and unsaturated polyhydric alcohols to yield, respectively, saturated and unsaturated halogen-containing polyesters. The latter may also be formed from polybasic (2,3-dihaloalkyl)succinic compounds and saturated polyhydric alcohols by including an unsaturated polybasic anhydride in the monomeric charge. However formed, these unsaturated polyesters can be further polymerized (cross-linked) with unsaturated monomers giving insoluble, infusible thermosets.

By "halo" or "halogen," as uesd in connection with the new compounds of this invention, is meant the non-metallic elements of the seventh group of the periodic system and in particular chlorine and bromine.

By the term "(2,3-dihaloalkyl)succinic compounds" is meant (2,3-hidaloalkyl)succinic anhydride, (2,3-dihaloalkyl)succinic acid, (2,3-dihaloalkyl)succinyl halide, esters of (2,3-dihaloalkyl)succinic acid, and similar succinic derivatives. These compounds are represented by the structural formula:

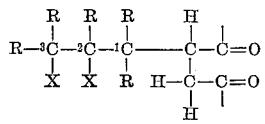

where "X" is an halogen atom and "R" is hydrogen or a lower alkyl substituent.

The halo groups are usually identical (e.g., both halo groups are chlorine or both are bromine) but can be different (e.g., where one halo is chlorine and the other is bromine). The R's can be the same or different (i.e., represent different substituents) and, when alkyl, generally have no more than five carbon atoms and, preferably, have only one or two carbons (i. e., R is methyl or ethyl).

In a particularly preferred group of (2,3-dihaloalkyl) succinic compounds the R in the "two" position is hydrogen and at least one of the R's in the "three" position is hydrogen (these compounds have greater stability than the corresponding alkyl substituted compounds).

Specific compounds included within the scope of this invention are the dihaloalkyl derivatives having not more than 6 carbon atoms therein, e.g. (2,3-dihalopropyl), (2,3-dihalobutyl), (2,3-dihalo-1-methylpropyl), (2,3-dihalo-1,1-dimethylpropyl), (2,3-dihalo-1-ethylpropyl), (2,3-dihalo-1-methylbutyl), (2,3-dihalo-1,1-dimethylbutyl), (2,3-dihalo-1-ethylbutyl), (2,3-dihalopentyl), etc., derivatives of succinic anhydride, succinic acid, etc.

By "succinic esters" as used above is meant both mono- and diesters formed from alcohols, which usually have no more than twelve carbon atoms and, preferably, no more than four carbons.

"Polybasic" means that the compound in question has two or more functional groups capable of being esterified with alcohols (which will generally be polyhydric). The resulting resinous compositions are the same in all cases.

The (2,3-dihaloalkyl)succinic anhydride and the (2,3-dihaloalkyl)succinic acid are conveniently prepared by halogen addition to allylsuccinic anhydride and allylsuccinic acid, respectively, following standard procedures and conditions. For example direct addition of bromine is generally run at low temperatures (i.e., minus twenty-five to plus fifty degrees centigrade) using a solvent such as chloroform, carbon disulfide, acetic acid or diethyl ether; it is sometimes aided by artificial light or sunlight. Strong heating is not recommended because it promotes substitution and dehydrohalogenation. Additions with more reactive gaseous chlorine are best carried out slowly at still lower temperatures (e.g., minus fifty to plus twenty-five degrees centigrade) to avoid side reactions. Sulfuryl chloride and pohsphorus pentachloride can be used as chlorinating agents where preferred. Mixed dihalides are readily prepared by substitution, for example, a bromochloride is formed by treating a dichloride with one molar equivalent of sodium bromide in acetone. Obviously these (2,3-dihaloalkyl)succinic compounds can be prepared from one another. For example, hydrolyzing the dihalo anhydride gives the corresponding acid (simply by boiling in water for several minutes).

Polyhydric alcohols suitable for reacting with these dihalo succinic compounds are saturated or unsaturated (double or triple bonds), and may be aliphatic or aromatic. Probably most often used are saturated dihydric alcohols, such as ethylene glycol, propylene glycol, the butene glycols, etc. Also suitable are polyhydric alcohols containing any functional group which remains unreactive during the esterification. For example, ethers and esters having at least two free hydroxyl groups, such as diethylene glycol, dipropylene glycol, the glycerol mono-ethers or esters, the pentaerythritol mono or diethers and/or esters, etc., are suitable. Examples of unsaturated polyhydric alcohols include: butyne-diol, the butene-diols, the allyl or vinyl glycerol ethers, the allyl or vinyl pentaerythritol ethers, etc. As a rule these polyhydric alcohols (saturated and unsaturated) have about twelve or fewer carbon atoms and, usually, no more than six carbons.

Unsaturated polybasic anhydrides suitable for polymerizing with the dihalo anhydride and thereby forming curable polyesters from what would otherwise be saturated polyesters have aliphatic carbon-to-carbon unsaturation. Suitable compounds may be described as being aliphatic or aromatic. Specific examples include maleic anhydride, itaconic anhydride, citraconic anhydride, tetrahydrophthalic anhydride, etc. Alternatively the corresponding polybasic acids and also unsaturated polybasic acids which do not form anhydrides, for example, fumaric acid and mesaconic acid, can be used in the monomer-charge to give unsaturated polyester resin. As a rule these unsaturated anhydrides and acids have about twelve or fewer carbon atoms and, usually, no more than six carbons.

Suitable cross-linking agents for copolymerizing with unsaturated polyesters have one or several polymerizable double bonds. Commonly used are styrene, vinyl toluene, diallyl phthalate, methyl methacrylate, triallyl cyanurate, and the like. Styrene is particularly preferred as an inexpensive cross-linking agent.

Esterification reaction catalysts such as sulfonic acids (e.g., p-toluene sulfonic acid) or amines (e.g., pyridine, triethylamine, quinoline, etc.) may be added to the reaction mixture where more rapid reactions are desired.

The proportion of polyhydric alcohol is approximately controlled by the total equivalents of acidic monomers (anhydrides and/or acids) employed in the charge. Preferably equivalent amounts are used, however, either the acids or alcohols may be in substantial excess. Usually no more than twenty percent excess monomer is used.

Chain-stoppers are sometimes added in minor proportions to rapidly terminate the growth of the polyester chain by introducing hydrocarbon terminal residues. Among the compounds suitable for use as chain-stoppers are monohydric alcohols (e.g., butyl, hexyl, octyl, dodecyl, benzyl, or tetrahydrofurfuryl alcohol) and monobasic acids (e.g., acetic, propionic, butyric, valeric, or benzoic acid).

The temperature for carrying out the reaction between the polyhydric alcohols and polybasic anhydrides (or acids) ranges from one hundred to two hundred degrees centigrade, although higher and lower temperatures can be used. Preferably one hundred and fifty to two hundred degrees centigrade is employed.

An inert gas such as nitrogen is passed through the mixture in the preferred procedure to eliminate side reactions. The progress of the reaction is followed by measuring the amount of water liberated, by determining the viscosity of the resin, from its acid number, or by using other commonly known methods. The extent to which the reaction is carried out will depend on a number of factors such as desired viscosity, acid number, etc.

As mentioned the unsaturated polyester resins are usually cured. This is accomplished by first preparing a solution or mixture of unsaturated polyester and cross-linking agent. This is most conveniently made while the unsaturated polyester is still hot, thereby facilitating rapid solution. Alternatively the unsaturated polyester is cooled and stored and, when ready for mixing, is heated to facilitate solution. A particularly preferred process is to prepare blends of unsaturated polyester containing about twenty percent cross-linking agent by weight, based on the polyester. These blends usually do not solidify on cooling and conveniently serve as "stock" solutions for preparing compositions containing cross-linking agent in, for example, thirty percent, forty-five percent, and sixty percent by weight, based on the unsaturated polyester.

The proportion of cross-linking agent to unsaturated polyester may be varied between the ultimate limits without departing from the scope of this invention. For example, only a small proportion of cross-linking agent is needed when the proportions of cross-linkable bonds in the unsaturated polyester is very small or when it is desired to react only a part of the total unsaturated polyester with the cross-linking agent. On the other hand, a major proportion of cross-linking agent may be employed when the proportion of cross-linkable bonds in the unsaturated polyester is high or when maximum utilization of double bonds is desired. In general the concentration of the cross-linking agent in the unsaturated polyester varies from about fifteen to about sixty percent by weight, based on the unsaturated resin. In certain formulations it is preferable to employ between about thirty and about forty-five percent of cross-linking agent by weight, based on the unsaturated resin.

Polymerization inhibitors, usually of the order of one thousandth to one percent by weight, based on the unsaturated polyester, may be added to prevent premature polymerization (curing). Among the inhibitors which may advantageously be employed are substances such as hydroquinone, benzoquinone, p-(t-butyl)catechol, p-phenylene diamine, trinitrobenzene, picric acid, etc.

Polymerization catalysts are preferably added to the mixture of unsaturated polyester and cross-linking agent to effect setting or curing. Usually employed are free-radical-forming catalysts such as molecular oxygen; peroxides (e.g., acetyl, benzoyl, or dicumyl peroxide); hydroperoxides (e.g., cumene hydroperoxide); peresters (e.g., potassium persulfates or t-butyl peracetate); and azo compounds (e.g., 2,2'-bisazobutyronitrile). Such catalysts are used in a proportion of one hundredth to ten weight percent, based on the unsaturated polyester, depending on the efficiency of their action and whether or not substances which inhibit polymerization are present in the mixture to be cross-linked.

Additionally activators or accelerators (e.g., cobalt naphthenate, alkyl mercaptans, dialkyl aromatic amines, etc.) are often used to promote the cross-linking reaction so that cure can be effected at lower temperatures or shorter reaction times. These are used in proportions similar to those stated for the catalysts.

The polymerization conditions for effecting the cross-linking reaction may be selected from a wide variety of techniques and commonly involve the application of heat. The temperature depends on a variety of factors, particularly the boiling point of the cross-linking agent, catalyst activation temperature, and the exothermic characteristics of the polymerization mixture (i.e., a temperature should be selected which will give a suitable reaction rate and yet not cause substantial volatilization).

The saturated polyesters of this invention are useful plasticizers, particularly where fire-retardant effects are also desired. Special application for these fire-retardant compositions is in the textile fiber field and as films (e.g., those used in electrical and packaging applications). Essentially 3-dimensional saturated polyesters have important utility as paint resins and in coating applications.

The unsaturated polyesters presently disclosed are important in a number of end uses where compositions highly resistant to burning are desired. For example reinforced with glass, asbestos, cellulose, or other fibers, they can be fabricated in so-called "reinforced plastics" end products. Mixed with reinforcing fiber, filler, and a catalyst the resins can also be formulated into putty-like or powdery premixes that can be molded. The un-saturated polyester resins can also be cast in buttons, rods, tubes, dies, and other end products. Foamed (blown) material can also be made which is flame-retardant.

Of the new compounds herein disclosed probably the most suitable and useful are the dibromides, that is (2,3-dibromoalkyl)succinic anhydride, and its various derivatives. These dibromides seem to afford better flame-retardance than the other dihalides and, for this reason, are fully described and characterized in the examples as being the best contemplated embodiment of this invention.

EXAMPLE 1

(2,3-dibromopropyl)succinic anhydride

A mixture of 600 g. of maleic anhydride (6.1 moles), 5.0 g. of p,t-butylcatechol, polmerization inhibitor, and 600 ml. of benzene, diluent, is placed in a steel bomb. Propylene, 490 g. (11.6 moles), is introduced and the bomb heated at 200° C. for about 12 hours. After the bomb is opened, the benzene is removed leaving a yellow-brown solution. Distillation through a packed column gives 245 g. of allylsuccinic anhydride, B.P. 131–132° C./9.0 mm.

A solution of 140 g. (1 mole) of allylsuccinic anhydride in 125 ml. of acetic acid is placed in a 1-l. flask equipped with a reflux condenser, a dropping funnel, and an electric stirrer, and a thermometer. To this is added a solution of 165 g. (1.03 moles) of bromine in 100 ml.

of acetic acid over a period of about 40 minutes. During the addition an ice bath is used to maintain the temperature at 20–25° C. After being stirred for about 18 hours at room temperature, acetic acid is removed from the reddish-orange solution. The product begins to distill at 193° C./2.0 mm. (pot, 204° C.); as the distillation proceeds the B.P. varies from 187° C./1.2 mm. (pot, 198° C.) to 200° C./2.2 mm. (pot, 224° C.)[1].

The (2,3-dibromopropyl)succinic anhydride, a viscous, pale yellow oil, weighs 261 g. (87% yield). *Analysis.—* Calcd. for $C_7H_8Br_2O_3$: C, 28.0%; H, 2.70%; Br, 53.3%. Found: C, 28.3%; H, 2.75%; Br, 53.0%.

EXAMPLE 2

*Self-extinguishing polyester resins containing dibromo-monomer*

A flask is provided with a distillation trap, an addition funnel, an electric stirrer, and a thermometer. A solution of 83.5 g. of propylene glycol (1.1 moles) in 50 ml. of xylene is added and the system flushed with nitrogen. The flask is heated until the xylene is refluxing[2] and a mixture of 49.0 g. of maleic anhydride (0.5 mole) and 147.5 g. of (2,3-dibromopropyl)succinic anhydride (0.5 mole) is added, starting the reaction. The pot temperature is maintained between 150° and 200° C. until polymerization is complete. The reaction is followed by measuring water collected in the distillation trap and periodically determining the acid number[3] of the reaction mixture. After 140 minutes the acid number has dropped to about 53.0, xylene is removed from the distillation trap and the reaction is stopped. The system is evacuated under reduced pressure to remove residual liquids and cooled to about 75° C.

To the above unsaturated polyester is introdued 56.0 g. of styrene (cross-linking agent) and 0.085 of hydroquinone (inhibitor)[4]. The ingredients are blended thoroughly with the polyester to give solution "A." "A" has an acid number of 44.5, a viscosity[5] of 1.25 stokes, weighs 307 g. (a 91% conversion), and is clear.

Thirty-five g. of "A" is agitated with 1.1 g. of 50% benzoyl peroxide and the resulting mixture is placed in a bottle[6] and several glass tubes[7]. The bottle is heated at 83° C. until a maximum exotherm is observed and, then, is placed in an oven at 130° C. for 21 hours. A maximum temperature of 140° C. is recorded after heating for 19 minutes. Casts are made in the tubes by heating at 80–90° C. for 25 minutes and at 130° C. for 21½ hours. The cured polyester castings are hard, tough, clear, insoluble, infusible and immediately self-extinguishing on removal from an oxidizing flame.

The remainder of solution "A" is used as "stock" to prepare compositions containing more styrene[8]. Polyester with 30% styrene (solution "B") is prepared by agitating 30.6 g. of "A" with 4.37 g. of styrene, and 1.10 g. of 50% benzoyl peroxide. Polyester with 45% styrene (solution "C") is obtained by mixing 24.1 g. of "A" with 10.9 g. of styrene and 1.10 g. of 50% benzoyl peroxide. Polyester with 60% styrene (solution "C") is prepared from 17.5 g. of "A," 17.5 g. of styrene, and 1.1 g. of the peroxide catalyst.

The 30%, 45% and 60% styrene-containing polyester solutions (i.e., "B," "C" and "D") are cast in tubes and rods by following the procedure previously described.

"B" exhibits a maximum exotherm of 144° C. after heating 17 minutes at 83° C.

"C" shows a maximum exotherm of 154° C. after heating 18 minutes at 83° C.

"D" has a maximum exotherm of 156° C. after heating 19 minutes at 83° C.

"B," "C" and "D" all give cured polyester resins which are hard, tough, clear, insoluble, infusible, and immediately self-extinguishing on removal from an oxidizing flame.

What is claimed is:

1. A polyester comprising the resinous reaction product of (1) a polybasic (2,3-dihaloalkyl)succinic compound having not more than 6 carbon atoms in the 2,3-dihaloalkyl moiety, and being selected from the group consisting of the anhydride, acid, succinyl halide, and esters of such acid having not more than 4 carbon atoms in the ester moiety and in which compounds "halo" and "halide" denote a member of the group consisting of bromine and chlorine, and (2) a polyhydric alcohol.

2. The polyester of claim 1 where the polybasic (2,3-diahloalkyl)compound is a (2,3-dihalopropyl)succinic anhydride.

3. The polester of claim 2 where the polybasic (2,3-dihalopropyl)succinic anhydride is a (2,3-dibromoproyl) succinic anhydride.

4. A curable polyester comprising the resinous reaction product of (1) a polybasic (2,3-dihaloalkyl)succinic compound having not more than 6 carbon atoms in the 2,3-dihaloalkyl moiety, and being selected from the group consisting of the anhydride, acid, succinyl halide, and esters of such acid having not more than 4 carbon atoms in the ester moiety, and in which compounds "halo" and "halide" denote a member of the group consisting of bromine and chlorine, (2) a polybasic unsaturated compound selected from the group consisting of anhydrides and acids having no more than 6 carbon atoms, and (3) a saturated polyhydric alcohol.

5. The curable polyester of claim 4 where the polybasic (2,3-dihaloalkyl)succinic compound is a (2,3-dihalopropyl)succinic anhydride.

6. The curable polyester of claim 5 where the polybasic (2,3-dihalopropyl)succinic anhydride is a (2,3-dibromopropyl)succinic anhydride.

7. The curable polyester of claim 6 where the polybasic unsaturated compound is maleic anhydride.

8. A cured polyester resin which comprises the reaction product of (1) an unsaturated polyester comprising the resinous reaction product of (a) a polybasic (2,3-dihaloalkyl)succinic compound having not more than 6 carbon atoms in the 2,3-dihaloalkyl moiety, and being selected from the group consisting of the anhydride, acid, succinyl halides, and esters of such acid having not more than 4 carbon atoms in the ester moiety, and in which compounds "halo" and "halide" denote a member of the group consisting of bromine and chlorine, (b) a polybasic unsaturated compound selected from the group consisting of anhydrides and acids having no more than 6 carbon atoms, and (c) a saturated polyhydric alcohol and (2) a cross-linking agent containing aliphatic carbon-to-carbon unsaturation.

---

[1] In another run the (2,3-dibromopropyl)succinic anhydride distilled at 168–181° C./0.2–017 mm. (pot, 179°–194° C.).
[2] Xylene forms an azeotrope with water formed during the polymerization; this is collected in the distillation trap and removed. The mixture refluxes at about 145° C.
[3] The acid number represents the amount of free acid present in a substance; it is expressed by the number of mg. of potassium hydroxide which are required to neutralize the acid in a g. of substance.
[4] The amount of styrene and hydroquinone employed is 20% and 0.03%, respectively, based on the unsaturated polyester resin.
[5] Viscosity is determined by using a Gardner bubble viscometer.
[6] The bottle has a 1 oz. capacity and contains a thermocouple. The outside of the well is greased with silicone oil and some oil is placed inside the well to conduct heat to the thermocouple.
[7] The glass tubes are sealed at one end, have an inside diameter of 19/64″, and are 6¾″ long. They are filled to 6½″ with polyester.
[8] Preferably "A" is used as stock rather than 100% polyester as the latter is solid and would have to be melted before the styrene could be blended.

9. The cured polyester resin of claim 8 where the polybasic (2,3-dihaloalkyl)succinic compound is a (2,3-dihaloalkyl)succinic anhydride.

10. The cured polyester resin of claim 9 where the polybasic (2,3-dihalopropyl)succinic compound is (2,3-dibromopropyl)succinc anhydride.

11. The cured polyester resin of claim 10 where the cross-linking agent containing aliphatic carbon-to-carbon unsaturation is styrene.

References Cited by the Examiner

UNITED STATES PATENTS

| | | | |
|---|---|---|---|
| 2,539,438 | 1/1951 | Kropa et al. | 260—869 |
| 3,060,146 | 10/1962 | Wismer et al. | 260—869 |
| 3,151,183 | 9/1964 | Bill et al. | 260—869 |

MURRAY TILLMAN, *Primary Examiner.*

JOHN T. GOOLKASIAN, *Assistant Examiner.*